Oct. 24, 1967    J. D. BROCK    3,348,739

HOT MIX STORAGE BIN

Filed Nov. 3, 1966

INVENTOR
JAMES D. BROCK
Newton, Hopkins,
Jones & Ormsby
ATTORNEYS

United States Patent Office
3,348,739
Patented Oct. 24, 1967

3,348,739
HOT MIX STORAGE BIN
James D. Brock, Chattanooga, Tenn., assignor to Industrial Boiler Company, Inc., Chattanooga, Tenn., a corporation of Tennessee
Filed Nov. 3, 1966, Ser. No. 591,911
8 Claims. (Cl. 222—146)

ABSTRACT OF THE DISCLOSURE

What is disclosed herein is a bin for storing a hot asphalt mix for long periods of time which includes a heated storage chamber for storing the hot asphalt mix, environment supply means for supplying a non-oxidizing gas under greater than atmospheric pressure to the storage chamber, and sealing means for substantially sealing the storage chamber to selectively restrict the escape of the non-oxidizing gas from the storage chamber.

This invention relates to a vessel for hot mix and more particularly to a hot mix storage bin for storing a hot mix such as hot asphalt mix.

There is a frequent requirement in the paving art for a bin to be used in the temporary storage of hot asphalt mixes consisting of asphalt and various sizes of aggregate. This requirement exists because of the difficulty in coordinating the production of hot asphalt mix by an asphalt plant with the use of the hot asphalt mix at various paving or construction sites remote from the asphalt plant. A bin at the paving or construction site avoids this difficulty because the bin provides a source of hot asphalt mix at the paving or construction site which is not dependent upon coordinating the use of the hot asphalt mix at the paving or construction site with the production of the hot asphalt mix at a remote asphalt plant.

However, a difficulty with prior art bins when used to meet this and similar requirements is that they provide for storage of hot asphalt mix for only relatively limited periods of time even though the temperature of the hot asphalt mix is maintained at a relatively high temperature. This is because it has been found that even with adequate heating means for heating hot asphalt mix within a prior art bin, it is not possible to store hot asphalt mix in a prior art bin for more than several days without the hot asphalt mix setting up, deteriorating, or otherwise becoming unusable. As a result of this difficulty with prior art bins, use has been made in the prior art of movable asphalt plants even though such asphalt plants are more expensive to make and to move than a bin.

The invention disclosed herein overcomes this and other difficulties encountered with prior art bins. This is because the invention provides a bin in which a hot asphalt mix may be stored for substantially unlimited periods of time without substantial setting up or deterioration of the hot asphalt mix occurring.

This improvement in bins is provided by a bin which has not only heating means for maintaining the temperature of the hot asphalt mix for extended periods of time but also environment means for establishing and maintaining a non-oxidizing environment within the bin. It has been found that when a non-oxidizing environment is maitained within a bin, hot asphalt mix stored within the bin does not set up or deteriorate for extended periods of time.

The period of time for which a hot asphalt mix may be stored in a bin embodying the invention disclosed herein is dependent upon the use of the bin since some air enters the bin with the asphalt mix when the hot asphalt mix is placed in a bin. However, under normal use and conditions at a paving or construction site, hot asphalt mix may be stored in a bin embodying the invention disclosed herein for several weeks without the hot asphalt mix setting up or deteriorating.

It is because of the extended periods of time for which hot asphalt mix may be stored in a bin embodying the invention disclosed herein, that the invention provides a bin which is suitable for storing a large portion of the hot asphalt mix requirements for a paving or construction site at the site so that the bin becomes in effect a relatively inexpensive satellite asphalt plant which avoids the difficulty in coordinating the production of hot asphalt mix by an asphalt plant with the use of the hot asphalt mix at various paving or construction sites remote from the plant. Those skilled in the art will recognize many other advantageous uses which may be made of a bin embodying the invention in view of the extended periods of time in which hot asphalt mix may be stored within the bin.

These and other features and advantages of the invention will be more clearly understood from the following detailed description and the accompanying drawings in which like characters of reference designate corresponding parts throughout and in which.

These figures and the following detailed description disclose a specific embodiment of the invention, but the invention is not limited to the details disclosed since it may be embodied in other equivalent forms.

Figure 1:
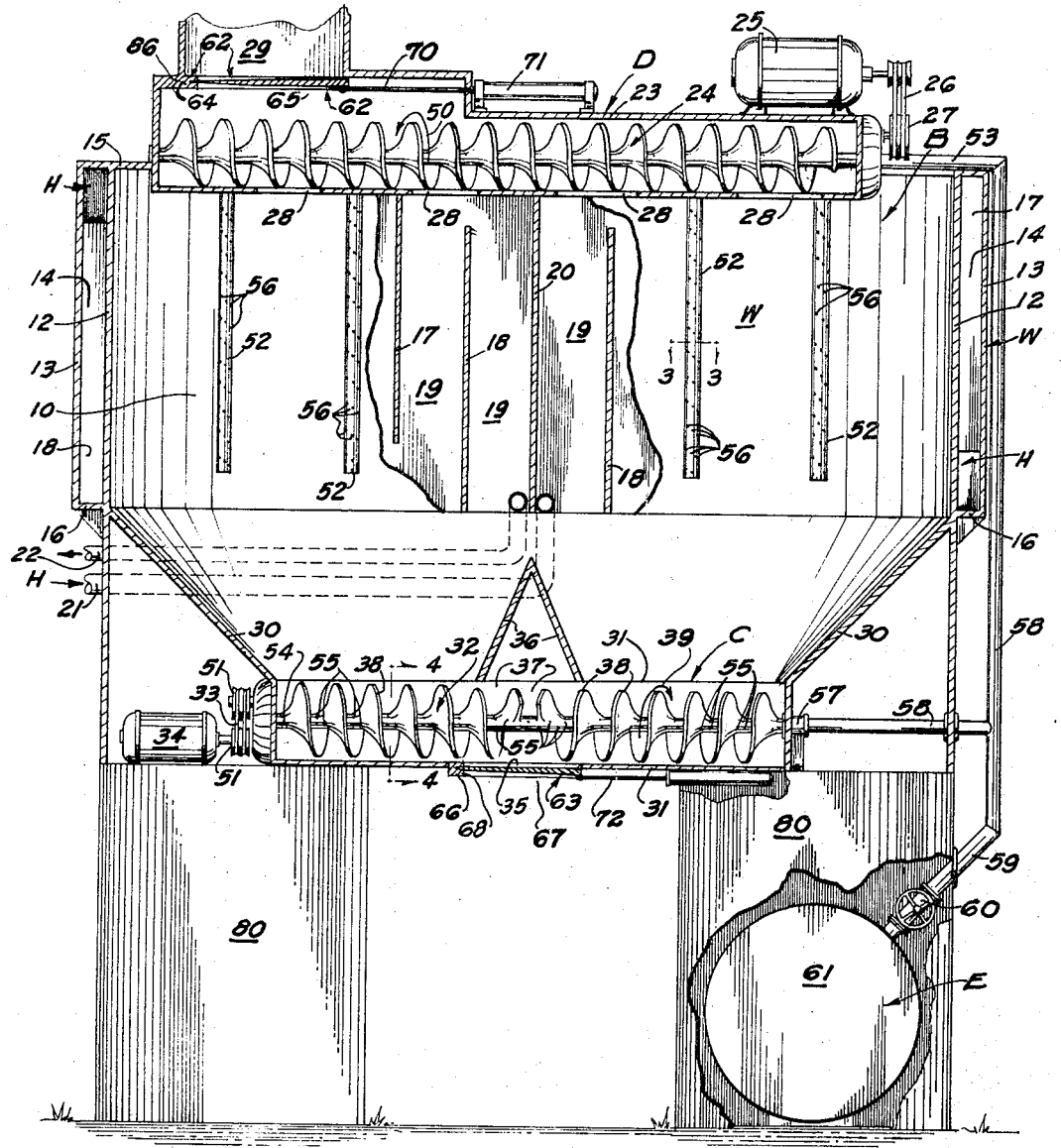
FIG. 1 is a sectional view of a bin embodying the invention disclosed herein.
Figure 2:
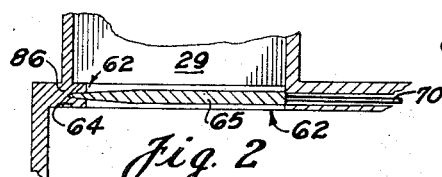
FIG. 2 is an enlarged sectional view of the upper sealing means in that embodiment of the invention disclosed herein.

Referring to FIG. 1, it will be seen that the invention comprises generally a bin B having a wall means W for defining a storage chamber 10, a distributing means D for distributing a hot asphalt mix along the length of the chamber 10, a conveying means C for conveying a hot asphalt mix within the storage chamber 10 to a discharge opening 35, a heating means H for maintaining the temperature of a hot asphalt mix in the storage chamber 10 substantially at a selected temperature, and an environment means E for establishing and maintaining a non-oxidizing environment within the storage chamber 10.

In that embodiment of the invention disclosed, the wall means W includes an inner wall 12 and an outer wall 13 parallel to and spaced from the inner wall 12 so as to define a heating cavity 14 which extends around the upper portion of the storage chamber 10. The heating cavity 14 is closed at its upper end by a cover plate 15 which also serves to provide a cover for the storage chamber 10. At its lower end, the heating cavity 14 is closed by a flange 16 which extends outwardly from the inner wall 12 to join the outer wall 13.

Within the heating cavity 14 and aiding to maintain the inner wall 12 in spaced relationship with the outer wall 13 are a plurality of downwardly extending vertical spacer members 17 alternating with a plurality of upwardly extending vertical spacer members 18. Each vertical spacer member 17 or 18 extends between the inner wall 12 and the outer wall 13 and the downwardly extending vertical spacer members 17 are integral with the cover plate 15 and spaced from the flange 16 while the upwardly extending vertical spacer members 18 are integral with the flange 16 and spaced from the cover plate 15. Thus, the vertical spacer members 17 and 18, the walls 12 and 13, the cover plate 15, and the flange 16 serve to define a channel 19 which surrounds the upper portion of the storage chamber 10 and which alternately extends upwardly and downwardly between the inner wall 12 and the outer wall 13.

In addition to the vertical spacer members 17 and 18, a divider member 20 also extends between the inner wall 12 and the outer wall 13. However, unlike the vertical spacer members 17 and 18, the divider member 20 extends between the cover plate 15 and the flange 16 so as to make the channel 19 discontinuous. Thus, it will be understood that if a heating medium such as hot oil is introduced into the channel 19 through an inlet pipe 21 on one side of the divider member 20 and is removed from the channel 19 on the opposite side of the divider member 20 through an outlet pipe 22, the heating medium will flow through the channel 19 in a path which is alternately upwardly and downwardly within the heating cavity 14.

This flow of a heating medium in the channel 19 will serve to heat or maintain the temperature of a hot asphalt mix within the storage chamber 10 for extended periods of time. Moreover, it will be understood that a variety of devices (not shown) for providing a heating medium may be operatively connected to the pipes 21 and 22 and that regardless of the device (not shown) used, the flow of a heating medium in the alternately upwardly and downwardly path defined by the channel 19 provides a heating means H which insures a substantially even vertical distribution of the heat provided by the heating medium so that zones or layers of different temperature are not formed in a hot asphalt mix within the storage chamber 10.

Carried by and partially extending through the cover plate 15 is the distributing means D which in that embodiment of the invention disclosed includes a conveyor housing 23 and a spiral conveyor 24 rotatably positioned within the conveyor housing 23. The spiral conveyor 24 is rotated by a conventional motor 25 positioned on the conveyor housing 23 and which drives the spiral conveyor 24 through a plurality of belts 26 and pulleys 27. That portion of the conveyor housing 23 which extends through the cover plate 15 has a contour generally corresponding to the contour of the spiral conveyor 24 and has a plurality of apertures 28 distributed along its length. At one end, the conveyor housing 23 is continuous with a receiving chute 29 by which hot asphalt mix is received into the conveyor housing 23 from a source of hot asphalt mix (not shown).

It will now be understood that rotation of the spiral conveyor 24 in that direction indicated by the arrow 50 in FIG. 1 causes hot asphalt mix received within the conveyor housing 23 through the receiving chute 29 to be moved along the length of the conveyor housing 23 by the spiral conveyor 24. As the hot asphalt mix moves along the length of the conveyor housing 23, the hot asphalt mix falls from the conveyor housing 23 through the apertures 28.

The lower portion of the storage chamber 10 is formed by walls 30 continuous with the inner wall 12 and inclined inwardly and downwardly to be also continuous with a conveyor chamber 31 in which a spiral conveyor 32 is rotatably positioned. It will be understood that the walls 30 serve to guide hot asphalt mix into the conveyor chamber 31 where rotation of the spiral conveyor 32 through belts 33 and pulleys 51 by a motor 34 causes the hot asphalt mix to be moved along the conveyor chamber 31.

In that embodiment of the invention disclosed, the conveyor chamber 31 has the discharge opening 35 in its lower side and above both the discharge opening 35 and the spiral conveyor 32 is a wedge shaped baffle 36. The baffle 36 prevents hot asphalt mix in the storage chamber 10 from passing downwardly by gravity through the spiral conveyor 32 and out the discharge opening 35. Thus, the baffle 36 defines a discharge zone 37 above the discharge opening 35 and it will be understood that only hot asphalt mix conveyed into the discharge zone 37 is discharged from the storage chamber 10 through the discharge opening 35.

Figure 4:
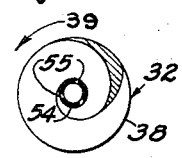
FIG. 4 is an enlarged cross-sectional view of the spiral conveyor for the conveying means in that embodiment of the invention disclosed herein.

That portion of the thread 38 of the spiral conveyor 32 to the left of the discharge zone 37 has a spiral which is opposite to the spiral of that portion of the thread 38 which is to the right of the discharge zone 37. Moreover, the thread 38 is arranged on both sides of the discharge zone 37 so that with rotation of the spiral conveyor 32 in the direction indicated by the arrow 39 in FIGS. 1 and 4, the hot asphalt mix is moved to the right by that portion of the spiral conveyor 32 to the left of the discharge zone 37 and is moved to the left by that portion of the spiral conveyor 32 to the right of the discharge zone 37. Thus, the conveyor chamber 31 and spiral conveyor 32 provide the conveyor means C which serves to discharge hot asphalt mix as required from the storage chamber 10 through the discharge opening 35.

The environment means E comprises an environment supply means for supplying a non-oxidizing gas to the storage chamber 10 of the bin B and a sealing means for preventing the non-oxidizing gas from escaping from the storage chamber 10. In that embodiment of the invention disclosed herein, the environment supply means is provided by a plurality of atmosphere supply tubes 52 extending downwardly into the storage chamber 10 through the cover plate 15 from a transverse pipe 53 positioned above the cover plate 15 and by using a hollow shaft 54 having a plurality of apertures 55 for the spiral conveyor 32. Each of the plurality of atmosphere supply tubes 52 has a plurality of apertures 56 and the hollow shaft 54 of the spiral conveyor 32 is connected through a conventional rotary seal 57 to a feeder pipe 58. The transverse pipe 53 and the feeder pipe 58 serves as a feeding means for feeding a non-oxiding gas to the atmosphere supply tubes 52 and the hollow tube 54 and are both continuous with a delivery pipe 59 which is connected through a valve 60 to a tank 61 containing a non-oxidizing gas such as helium, nitrogen or carbon dioxide under greater than atmospheric pressure.

Figure 3:
FIG. 3 is an enlarged sectional view of an atmosphere supply pipe in that embodiment of the invention disclosed herein.

As will be seen from FIG. 3, the apertures 56 in each of the plurality of atmoshpere supply tubes 52 are inclined downwardly as they extend outwardly in order to insure that the apertures 56 do not become clogged with hot asphalt mix as the hot asphalt mix moves downwardly in the storage chamber 10 upon being received in or discharged from the bin B. Similarly, it will be seen from FIG. 4, that the apertures 55 in the hollow shaft 54 of the spiral conveyor 32 are each inclined to a radius of the hollow shaft 54 so that rotation of hollow shaft 54 in the direction indicated by the arrow 39 in FIGS. 1 and 4 does not cause hot asphalt mix to enter the apertures 55. Thus, the apertures 55 and the apertures 56 are both arranged to insure that hot asphalt mix in the storage chamber 10 does not prevent the passage of a non-oxidizing gas into the storage chamber 10.

In that embodiment of the invention disclosed herein, the sealing means of the environment means E includes an upper sealing means 62 for selectively closing the receiving chute 29 and a lower sealing means 63 for selectively closing the discharge opening 35. The upper sealing means 62 includes a channel member 64 positioned on three walls of the receiving chute 29 and a gate 65 slideably movable through the fourth wall of the receiving chute 29 between a position in which it is removed from the receiving chute 29 and a position in which its edge 86 is wedged into the channel member 64. Similarly, the lower sealing means 63 includes a channel member 66 positioned on three sides of the discharge opening 35 and a gate 67 slideably movable across the fourth side of the discharge opening 35 between a position in which it is removed from the discharge opening 35 and a position in which its edge 68 is wedged into the channel member 66.

The wedging of the gate 65 into the channel member 64 and the moving of the gate 65 into a position in which it does not extend across the receiving chute 29 is provided by operatively connecting the gate 65 to one end of a piston 70 extending from a fluid cylinder 71. The cylinder 71 is conventional in that the selective application of fluid pressure from a fluid source (not shown) causes the piston 71 to move to the left or right as viewed in FIG. 1 and the gate 65 to move between that position in which it closes and seals the receiving chute 29 and that position in which it permits hot asphalt mix to pass into the conveyor housing 23.

Similarly, the wedging of the gate 67 into the channel member 66 and the moving of the gate 67 into a position in which it does not extend across the discharge opening 35 is provided by operatively connecting the gate 67 to one end of a piston 72 extending from a fluid cylinder 73. The cylinder 73 is also conventional and similar to the cylinder 71 in that the selective application of fluid pressure causes the piston 72 to move to the left or right as viewed in FIG. 1 and the gate 67 to move between that position in which it closes and seals the discharge opening 35 and that position in which it permits the discharge of hot asphalt mix from the bin B.

The wall means W, the walls 30, the conveyor housing 23 and the conveyor chamber 31 are substantially airtight in construction and it will now be understood that with the gate 65 wedged into the channel member 64 and the gate 67 wedged into the channel member 66, a substantially sealed environment is provided for hot asphalt mix in the storage chamber 10 and the conveyor chamber 31. Moreover, it will also be understood that the nature of this environment is determined by the gas supplied through the plurality of atmosphere supply tubes 52 and the hollow shaft 54.

Thus, when the valve 60 is open and a non-oxidizing gas in the tank 61 passes into the bin B through the plurality of apertures 56 in the atmosphere supply tubes 52 and through the plurality of apertures 55 in the hollow shaft 54 of the spiral conveyor 32, a non-oxidizing environment is provided for hot asphalt mix in the storage chamber 10. Since the pressure of the non-oxidizing gas in the tank 61 is greater than atmospheric pressure, the non-oxidizing gas forces atmospheric air from the bin B when either the receiving chute 29 is opened by the upper sealing means 62 or the discharge opening 35 is opened by the lower sealing means 63. However, the escaping of the non-oxidizing gas from the bin B is substantially stopped when both the receiving chute 29 and the discharge opening 35 are closed and this serves to limit the total mount of non-oxidizing gas required to that amount necessary to fill the bin B and that relatively small amount which escapes when hot asphalt mix is received in or removed from the bin B.

It will be understood that any suitable conventional non-oxidizing gas may be used with the environmental means E in a bin having a heating means H but that regardless of the non-oxidizing gas used, the environment means E of the bin B provides a bin B in which hot asphalt mix will not set up or deteriorate even when stored in the bin B for several weeks. It is for this reason that a bin B embodying the invention disclosed herein is ideally suited to the prolonged storage of a major portion of the requirements for hot asphalt mix at a paving or construction site.

It is also for this reason that a bin B embodying the invention disclosed herein has many other advantageous applications and uses which will be readily apparent to those skilled in the art. In this connection, it should be emphasized that the bin B may be supported by base members 80 in a raised position for delivery of hot asphalt mix directly into a truck or may be placed in any of many other positions which will be obvious to those skilled in the art.

It will also be obvious to those skilled in the art that many variations may be made in the embodiments chosen for the purpose of illustrating the present invention without departing from the scope thereof as defined by the appended claims.

What is claimed as invention is:

1. In a bin for storing a hot asphalt mix, wall means for defining a storage chamber, distributing means for distributing a hot asphalt mix to said storage chamber, heating means for heating a hot asphalt mix within said storage chamber, conveying means for conveying a hot asphalt mix from said storage chamber, environment supply means for supplying a non-oxidizing gas under greater than atmospheric pressure to said storage chamber, and sealing means for substantially sealing said storage chamber to selectively restrict the escape of said non-oxidizing gas from said storage chamber.

2. The bin of claim 1 including a receiving chute through which a hot asphalt mix enters said bin and in which said sealing means includes a gate means selectively positionable to open and close said receiving chute.

3. The bin of claim 2 having an opening for discharge of a hot asphalt mix from said bin and in which said sealing means includes a gate means selectively positionable to open and close said opening.

4. The bin of claim 3 including a baffle positioned in said storage chamber to define a discharge zone above said opening.

5. The bin of claim 1 in which said distributing means includes a spiral conveyor positioned to convey a hot asphalt mix along a conveyor housing above said storage chamber.

6. The bin of claim 1 in which said wall means includes an inner wall spaced from an outer wall by a plurality of spacer members to form a heating cavity and in which said heating means includes an inlet pipe and an outlet pipe for passing a heating medium into and out of said heating cavity.

7. The bin of claim 1 in which said conveying means includes a spiral conveyor having a hollow shaft with a plurality of apertures and positioned to engage a hot asphalt mix within said storage chamber, and in which said environment supply means includes said hollow shaft and feeding means for feeding a non-oxidizing gas into said hollow shaft under pressure.

8. The bin of claim 1 in which said environment supply means includes a plurality of tubes positioned to extend into a hot asphalt mix within said storage chamber, each of said tubes having a plurality of apertures; and feeding means for feeding a non-oxidizing gas into said tubes under pressure.

References Cited

UNITED STATES PATENTS

| | | | |
|---|---|---|---|
| 2,515,136 | 7/1950 | Pigott | 126—343.5 X |
| 2,710,744 | 6/1955 | Hensler | 259—157 |
| 3,182,859 | 5/1965 | Harris et al. | 126—343.5 X |
| 3,305,138 | 2/1967 | Plumb | 222—146 |

CHARLES J. MYHRE, *Primary Examiner.*